No. 895,445. PATENTED AUG. 11, 1908.
L. E. FINCH.
GATE LATCH.
APPLICATION FILED OCT. 3, 1907.
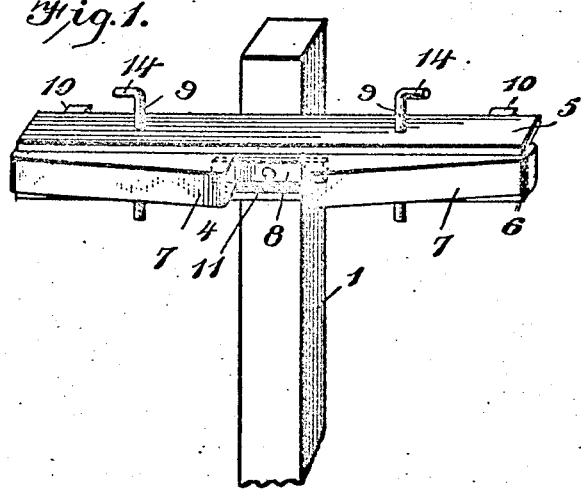
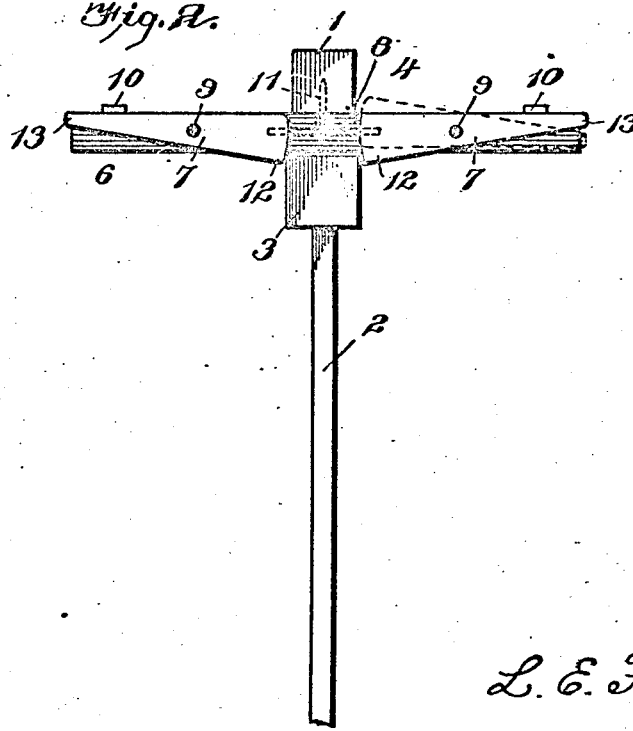
Witnesses
T. P. Brett
E. C. Duffy
Inventor
L. E. Finch
By O. E. Duffy
Attorneys

UNITED STATES PATENT OFFICE.

LOREN E. FINCH, OF THREE FORKS, MONTANA.

GATE-LATCH.

No. 895,445.  Specification of Letters Patent.  Patented Aug. 11, 1908.

Application filed October 3, 1907. Serial No. 395,740.

*To all whom it may concern:*

Be it known that I, LOREN E. FINCH, a citizen of the United States, residing at Three Forks, in the county of Gallatin and State of Montana, have invented certain new and useful Improvements in Gate-Latches; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to gate latches and has for its object to provide a device which is designed particularly for use on gates in fences inclosing stock.

As is well known gates are frequently opened by stock and in some instances it is an extremely difficult matter to keep the stock confined owing to their ability to open the gates.

My invention has for its object to provide a simple and inexpensive gate latch which has been found by experience cannot be opened by stock.

With this object in view my invention consists in the novel construction and arrangement of the gate latch as will be hereinafter fully described and afterwards specifically pointed out in the appended claim.

Referring to the accompanying drawing: Figure 1 is a perspective view illustrating a fence post and the gate latch arranged thereon, and Fig. 2 is a top plan view showing the gate fence post and latch, the upper frame or guard of the latch being removed.

Like numerals of reference indicate the same parts throughout the two figures in which, 1 indicates a gate post, 2 the gate having the post 3, and 4 indicates the gate latch.

The gate latch comprises an upper horizontal guard or frame 5 and lower horizontal guard or frame 6, two pivoted dogs 7 and a spring 8 in engagement with said dogs. The dogs 7 are arranged between the horizontal guards 5 and 6 and pivoted therein by means of pins 9, while suitable vertical stops 10 are provided to limit the movement of the dogs 7 as shown in Fig. 2. The spring 8 is secured to the post 1 by means of a spike or other fastening 11. As will be seen from Fig. 2 the dogs 7 are covered by the guards 5 and 6 except the inner portions 12 which extend slightly beyond the said guards 5 and 6 to engage the gate, while the outer portions 13 of the dogs 7 are much narrower than the inner portions 12, thus it will be seen that the dogs 7 are tapered.

As shown in Fig. 1 the pivoting pins 9 are provided with a hooked upper end 14 so as to permit ready withdrawal of the pins in order to remove the dogs 7.

Having thus described the several parts of my invention its operation is as follows: In closing the gate 2 the post 3 strikes the inner portion 12 of one of the dogs 7, forcing said dog into position shown in dotted lines in Fig. 2. As soon, however, as the gate is in its central position the spring 8 forces the dog 7 into its normal position shown in full lines in Fig. 2, thereby securely holding the gate in a closed position. In order to open the gate the end 13 of one of the dogs is pulled away from its guard 10 into position shown in dotted lines in Fig. 2 which allows the gate to be swung toward the operator. However it will be seen that owing to the guards 5 and 6 which cover the dogs, with the exception of the enlarged inner ends 12, that stock cannot manipulate the dogs 7 in order to open the gate, as said dogs are covered by the guards 5 and 6 as clearly shown.

Having thus fully described my invention what I claim as new and desire to secure by Letters Patent of the United States, is;—

A gate latch comprising a horizontal upper guard, a horizontal lower guard, two tapered dogs arranged between said upper and lower guards, a pin for each dog entering said upper and lower guards for pivoting the dogs within the said guards, a single spring in engagement with the inner ends of said dogs, the whole arranged in such manner that the said guards protect the said dogs and the said dogs are held in locking position by a single spring.

In testimony whereof I affix my signature in presence of two witnesses.

LOREN E. FINCH.

Witnesses:
H. B. SMITH,
R. R. FINLAY.